Oct. 4, 1932.  A. WOLLENSAK  1,880,635
MICROMETER MOUNT
Original Filed Oct. 14, 1929
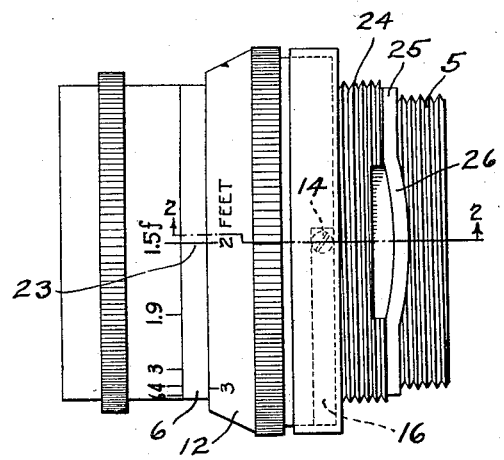
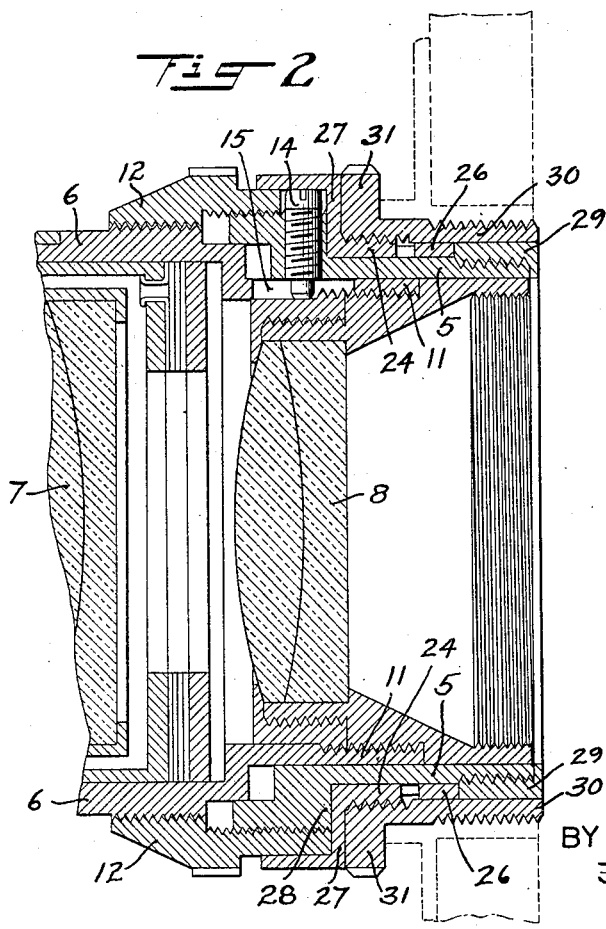
INVENTOR
Andrew Wollensak
BY
Farnum F. Dorsey
HIS ATTORNEY Patented Oct. 4, 1932

1,880,635

UNITED STATES PATENT OFFICE

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK

MICROMETER MOUNT

Original application filed October 14, 1929, Serial No. 399,582. Divided and this application filed February 8, 1932. Serial No. 591,525.

This invention relates to means for supporting and adjusting either or both the lens and the diaphragm of a photographic camera. While suitable for various applications, it is particularly designed and useful for application to a cinematographic camera.

In a mechanism or mount for the purpose in question, it is common to adjust the lens or the diaphragm by means of a ring surrounding the body of the mount and having limited rotational movement thereon. The body and the adjusting ring are commonly provided with marks and figures to indicate the stop diameter or the focal distance, as the case may be. Since a mount of this type is commonly secured to the camera body by means of a mounting ring screwed into a threaded opening in the front of the camera, it may happen that the mount, when so screwed into place, will come to a position in which the index marks are not in a position where they may be seen conveniently. The object of the present invention is to provide, in a simple and convenient manner, against this contingency.

To the foregoing end it is proposed to interpose, between the screw-threaded mounting ring and the body of the mount, a connection permitting relative rotation of these parts but including means frictionally opposing such rotation, the construction being such that no rotation normally occurs, but that, by the exertion of sufficient force, the body of the mount may be turned to bring the index marks into convenient position.

In the accompanying drawing, Fig. 1 is a side elevation of a micrometer mount embodying the present invention, with certain parts removed to show the interior construction, and Fig. 2 is a partial sectional view of the complete mount, on the line 2—2 in Fig. 1, but on a larger scale.

The invention is illustrated as embodied in a micrometer mount comprising two generally cylindrical members or tubes 5 and 6 which have a sliding or telescopic engagement with each other. The body tube 5 is normally stationary, while the lens tube 6 carries the lenses and the diaphragm and is movable axially for the purpose of focusing. The lenses 7 and 8 are mounted in suitable cells, fixed to the lens tube. The rear portion 11 of the lens tube is of reduced diameter and fits and slides within the rear portion of the body tube.

Focusing movement is produced by a ring 12 which surrounds the body tube and the lens tube and has a differential screw-threaded engagement with them. Rotation of the focusing ring 12 causes axial movement of the lens tube 6 in a well known manner. To prevent rotation of the lens tube the body tube is provided with a screw 14 of which the inner end engages a slot 15 in the reduced part 11 of the lens tube. The head of the screw also serves to limit the rotation of the focusing ring, since it engages an elongated recess 16 in the rear edge of the ring, as shown in dotted lines in Fig. 1.

The lens tube is provided with an index mark 23, which cooperates with graduations on the focusing ring to indicate the adjustment of the focus, and the purpose of the invention is to permit this index mark to be brought to a convenient position for observation. The part of the mount which is screwed into the camera front (indicated in dotted lines in Fig. 2) and which is hereinafter designated as the "mounting ring", comprises a sleeve 30 provided with the usual screw-threaded exterior surface and with a knurled flange 31 by which it may be turned to screw it into the camera. Associated with this sleeve and constituting a part of the mounting ring is an inner annular member 24 which is screwed into the outer end of the sleeve 30. The member 24 has an outwardly extending flange 27, providing a shoulder which engages a corresponding shoulder 28 on the body tube 5. At its rear margin the ring 24 has a smooth cylindrical portion 25 which provides a rearwardly-disposed shoulder and is slotted at two or more points, as shown in Fig. 1, to produce narrow flexible strips 26 of metal which are free except at their ends. These strips are bent to a slightly bowed form. At the rear end of the body tube 5 a ring 29 is screwed upon its outer surface, and the space between the forward edge of this ring and the shoulder 28 of the body ring is such that the flexible strips 26 are forced back into substantially straight position, so that they exert a constant resilient pressure against the ring 29 and cause a frictional pressure between the flange 27 and the shoulder 28.

The friction caused by the means just described is sufficient to prevent any relative rotation of the body tube and the mounting ring during ordinary manipulation of the focusing ring. However, after the mount has been screwed home on the camera, if it be found that the index mark 23 is in an inconvenient position, it is necessary only to impart an extra degree of rotative force to the focusing ring in order to cause slippage between the body tube and the mounting ring, which permits rotation of the lens ring to bring the mark 23 to the top of the mount or other convenient position for observation.

This application is a division of my application for Letters Patent of the United States, filed October 14, 1929, Serial No. 399,582, which matured into Patent No. 1,848,402, March 8, 1932.

The invention claimed is:

1. A micrometer mount comprising a body member, an adjustable device carried thereby, means for adjusting said device comprising a manually operable ring surrounding the body member and partially rotatable thereon, and a screw-threaded mounting ring for attaching the mount to a camera; the mounting ring and the body member having interengaging portions permitting relative rotation but not relative axial movement and being provided with frictional means for yieldingly resisting such relative rotation.

2. A micrometer mount comprising a body member, a lens carrying member supported by the body member and adjustable therein for focusing, means for causing such focusing adjustment comprising a graduated manually operable ring surrounding the body member and partially rotatable thereon, and a screw-threaded mounting ring for attaching the mount to a camera; the mounting ring and the body member having interengaging portions preventing relative axial movement but permitting relative rotative movement of these parts, and being provided with frictional means for yieldingly resisting such rotative movement.

3. A micrometer mount comprising a body tube, an adjustable device carried thereby, means for adjusting said device comprising a manually operable ring surrounding the body and partially rotatable thereon, and a screw-threaded mounting ring surrounding the body member, the body member and the mounting ring having interengaging shoulders, and resilient means interposed between the mounting ring and the body member for maintaining a constant pressure between said shoulders to oppose a yielding frictional resistance to rotation of the body member within the mounting ring.

4. A micrometer mount comprising a mounting member and a body member of annular form and concentrically arranged, with interengaging parts permitting relative rotation but not relative axial movement, said parts comprising interengaging shoulders and spaced, opposed cylindrical surfaces, one of said members being provided with resilient means in the form of a curved bar lying between said surfaces, and the other of said members having a shoulder engaged yieldingly by said bar, whereby frictional resistance is created between said interengaging shoulders on said members.

ANDREW WOLLENSAK.